United States Patent [19]

Mitsui et al.

[11] Patent Number: 4,751,005
[45] Date of Patent: Jun. 14, 1988

[54] METHOD FOR TREATMENT OF WASTE WATER

[75] Inventors: Kiichiro Mitsui, Akashi; Sadao Terui, Hyogo; Kunio Sano, Ako; Toshihide Kanzaki, Hyogo; Kazuyoshi Nishikawa, Himeji; Akira Inoue, Hirakata, all of Japan

[73] Assignee: Nippon Shokubai Kagaku Kogyo Co., Ltd., Osaka, Japan

[21] Appl. No.: 87,102

[22] Filed: Aug. 19, 1987

[30] Foreign Application Priority Data

Aug. 22, 1986 [JP] Japan ................... 61-195501

[51] Int. Cl.$^4$ .................. C02F 11/08; C02F 1/72; C02F 1/78
[52] U.S. Cl. ................... 210/759; 210/760; 210/762; 502/242; 502/349
[58] Field of Search ............... 210/759-763; 502/102, 242-245, 349-350

[56] References Cited

U.S. PATENT DOCUMENTS

| 3,887,740 | 6/1975 | Foster et al. | 502/242 X |
| 3,992,295 | 11/1976 | Box, Jr. et al. | 210/762 |
| 4,134,852 | 1/1979 | Volin | 502/349 X |
| 4,141,829 | 2/1979 | Thiel et al. | 210/762 |
| 4,189,405 | 2/1980 | Knapton et al. | 502/242 X |
| 4,268,399 | 5/1981 | Box, Jr. et al. | 210/762 |
| 4,294,703 | 10/1981 | Wilms et al. | 210/763 X |
| 4,422,960 | 12/1983 | Shiroto et al. | 502/242 X |
| 4,696,749 | 9/1987 | Habermann et al. | 210/763 X |
| 4,699,720 | 10/1987 | Harada et al. | 210/762 |

FOREIGN PATENT DOCUMENTS

| 61-257292 | 11/1986 | Japan | 210/762 |
| 62-42792 | 2/1987 | Japan | 210/763 |

Primary Examiner—Tom Wyse
Attorney, Agent, or Firm—Omri M. Behr

[57] ABSTRACT

Efficient treatment of waste water is accomplished by subjecting the waste water to wet oxidation under continued supply of an oxygen containing gas at a temperature of not more than 370° C. under a pressure enough for the waste water to retain the liquid phase thereof intact, in the presence of a catalyst containing a composite oxide of at least two metals selected from the group consisting of Ti, Si, and Zr and at least one metal selected from the group consisting of Mn, Fe, Co, Ni, W, Cu, Ce, Ag, Pt, Pd, Rh, Ru, and Ir or a compound of the one metal mentioned above.

17 Claims, No Drawings

METHOD FOR TREATMENT OF WASTE WATER

BACKGROUND OF THE INVENTION

1. Field of the Invention

This invention relates to a method for the treatment of waste water. Particularly, it relates to a method for effecting wet oxidation of waste water containing a substance of chemical oxygen demand (hereinafter referred to as "COD component") in the presence of a catalyst. More particularly, it relates to a method for effectively detoxifying waste water containing a COD component, i.e. a harmful oxidizable organic or inorganic substance, by subjecting the waste water to catalytically wet oxidation in the presence of molecular oxygen thereby converting the harmful substance into such harmless compounds as carbon dioxide, water, and nitrogen.

2. Description of the Prior Art

Among the conventional means available for the treatment of waste water, there are counted a biochemical method called an activated sludge method and a wet oxidation method called a Zimmerman method.

As widely known, the activated sludge method consumes much time in the decomposition of organic matter and, moreover, requires the waste water to be diluted to a concentration suitable for the of algae and bacteria and, therefore, has a disadvantage that the ground area for installation of facilities for the activated sludge treatment is very large. Further in recent years, particularly in the urban districts, the disposal of grown excess sludge has been entailing a huge expense. The Zimmerman method consists in effecting oxidative decomposition of organic matter contained in a high concentration in an aqueous solution by introducing air under a pressure in the range of 16 to 200 atmospheres at a temperature in the range of 200° to 370° C. into the aqueous solution. This method requires to use a large reactor because the reaction proceeds slowly and the decomposition consumes much time. Further, the reactor itself requires the material thereof to possess high durability. Thus, this method is not economically advantageous because of high cost of equipment and high cost of operation. In connection with this method, it has been proposed to use various oxidative catalysts aimed at accelerating the reaction velocity.

Among the catalysts heretofore used popularly in the catalytically wet oxidation method, there are counted compounds of such noble metals as palladium and platinum (Japanese Patent Laid-Open No. SHO 49(1974)-44,556) and compounds of such heavy metals as cobalt and iron (Japanese Patent Laid-Open No. SHO 49(1974)-94,157). They are catalysts which have the compounds deposited on spherical or cylinderical carriers of alumina, silica-alumina, silica gel, and activated carbon. More often than not, in the catalystically wet oxidation of waste water, these catalysts are put to use in the reaction at a pH value of not less than 9. In our experiment, the catalysts, in the course of their protracted use, have been found to suffer from loss of strength and disintegration of individual particles and, in an extreme case, entail dissolution of their carrier.

In an effort to solve this problem, there have been recently proposed methods for reinforcing the catalysts by using titania or zirconia as a carrier therefor (Japanese Patent Laid-Open Nos. SHO 58(1983)-64,188 and SHO 59(1984)-19757). To be specific, these inventions disclose catalysts which have compounds of such noble metals as palladium and platinum or compounds of such heavy metals as iron and cobalt deposited on spherical or cylindrical carrier particles of titania or zirconia. By experiment, the carriers are certainly found to possess greater strength than the conventional carriers. These catalysts, however, are invariably in a particulate form. Moreover, they are not fully satisfactory in terms of catalytic activity and durability.

Incidentally, when the waste water is subjected to wet oxidation, there inevitably arises the necessity of disposing of a large volume of water. As regards the manner of reaction, therefore, the method of using a fixed bed in a system designed for flow of waste water is frequently adopted. Moreover, numerous samples of waste water contain solid substances. If, in any of these cases, a given catalyst is in a particulate form, since the flow of the waste water induces heavy loss of pressure, the waste water cannot be treated at a high linear velocity and the current of this waste water must be given a large cross section. In the treatment of waste water entraining a solid substance, since the solid substance clogs the fixed bed of catalyst even to an extent of increasing the resistance which the fixed bed of catalyst offers against the flow of waste water, this treatment entails a disadvantage that the running cost is increased and the apparatus for treatment cannot be operated continuously for a long time. In the treatment of waste water by the catalytically wet oxidation method using such particulate shaped catalyst, since the reaction is carried out at an elevated temperature under a high pressure and the ground area occupied by the reactor must be proportionately large, the cost of equipment is huge. The high cost of equipment constitutes a critical problem.

As regards the life of catalyst, the particulate catalyst has a disadvantage that by mutual contact of the particles, the catalyst is comminuted by friction and disintergration. For the purpose of diminishing the loss of pressure due to the catalyst bed, there has been proposed a fluidized-bed method which comprises fluidizing a catalyst in a powdery form in a current of waste water. This method, however, has not yet been adopted for actual use because the catalyst by nature is diluted and the reactor used for the treatment, therefore, must possess a huge capacity and the separation of the catalyst form the treated waste water is very difficult.

There also are methods which effect oxidative decomposition of organic matter in waste water at normal room temperature under normal atmospheric pressure by using ozone or hydrogen peroxide as an oxidizing agent. Japanese Patent Laid-Open No. SHO 58(1983)-55,088, for example, discloses a method which effects oxidative decomposition of such organic substances as fumic acid contained in waste water by treating this waste water with ozone and hydrogen peroxide at 20° C. under normal atmospheric pressure in the absence of a catalyst. Japanese Patent Publication No. SHO 58(1983)-37,039 discloses a method which effects oxidative decomposition of an aromatic ring-containing organic compound contained in waste water by adding a surfactant to the waste water, further adding thereto at least one member selected from the group consisting of transient metal compounds and alkaline earth metal compounds, and then exposing the resultant mixture to ozone at normal room temperature under normal atmospheric pressure. Since the former method effects the treatment in the absence of a catalyst, it is incapable of effectively treating sparingly oxidizable substances suspended in waste water. Since the latter method uses the metal ion such as of transient metal or alkaline earth metal as a catalyst, it is required to recover the metal ion contained in the treated waste water before this treated waste water is released into a nearby body of running water. It has a disadvantage that it inevitably requires an extra step of aftertreatment. Further, since both these methods require the treatments for waste water to be carried out at normal room temperature under normal atmospheric pressure, they have a disadvantage that they call for supply of a large volume of expensive ozone, their reactions proceed at a low rate, their ratios of decomposition of organic matter are low, and the treated waste water require a treatment for detoxification because the unaltered ozone leaks in the treated water.

An object of the present invention, therefore, is to provide a method for efficient and long continuous treatment of waste water.

Another object of this invention is to provide a method for enabling the treatment of waste water to be carried out efficiently in a high linear velocity.

Yet another object of this invention is to provide a method for enabling waste water containing solid substances to be treated stably at a high linear velocity continuously for a long time.

SUMMARY OF THE INVENTION

The objects described above are accomplished by a method for the treatment of waste water, which method is characterized by subjecting the waste water to wet oxidation at a temperature of not more than 370° C. under a pressure enough for the waste water to retain the liquid phase thereof intact under continued supply of a gas containing oxygen in an amount of 1.0 to 1.5 times the theoretical amount necessary for enabling the organic and inorganic substances contained in the waste water to be decomposed thoroughly into nitrogen, carbon dioxide, and water, in the presence of a catalyst composed of catalyst component A comprising a composite oxide of at least two metals selected from the group consisting of titanium, silicon, and zirconium and catalyst component B comprising at least one metal selected from the group consisting of manganese, iron, cobalt, nickel, tungusten, copper, cerium, silver, platinum, palladium, rhodium, ruthenium, and iridium or a water-insoluble or sparingly water-soluble compound of the metal.

This invention also concerns a method for the treatment of waste water wherein the catalyst has monolithic structure. This invention further pertains to a method for the treatment of waste water wherein the catalyst is a honeycomb type having through holes of a equivalent diameter in the range of 2 to 20 mm, a cell wall thickness in the range of 0.5 to 3 mm, and an opening ratio in the range of 50 to 80%. This invention also relates to a method for the treatment of waste water, which method effects the passage through the catalyst of the waste water in combination with an oxygen-containing gas in the presence of ozone and/or hydrogen peroxide.

DESCRIPTION OF THE PREFERRED EMBODIMENT

The catalyst to be used in the present invention is a catalyst which is composed of catalyst component A comprising a composite oxide of at least two metals selected from the group consisting of titanium, silicon, and zirconium and catalyst component B comprising at least one metal selected from the group consisting of manganese, iron, cobalt, nickel, tungsten, copper, cerium, silver, platinum, palladium, rhodium, ruthenium, and iridium or a water-insoluble or sparingly water-soluble compound of the metal.

The catalyst contemplated by the present invention is characterized by using as a catalytic component thereof a binary composite oxide comprising titanium and silicon (hereinafter referred to as "$TiO_2$—$ZrO_2$"), a binary composite oxide comprising titanium and zirconium (hereinafter referred to as "$TiO_2$—$ZrO_2$"), a binary composite oxide comprising zirconium and silicon (hereinafter referred to as "$ZrO_2$—$SiO_2$"), or a ternary composite oxide comprising titanium, silicon, and zirconium (hereinafter referred to as "$TiO_2$—$SiO_2$—$ZrO_2$").

Generally, the binary composite oxide comprising titanium, and silicon, from the report of Kozo Tanabe "Catalyst," Vol. 17, No.3, page 72(1975), has been widely known as a solid acid. It exhibits conspicuous acidity not found in either of the component oxides thereof and possesses a large surface area.

The $TiO_2$—$SiO_2$ is not a mere mixture of titanium dioxide with silicon dioxide but is a product which is inferred to manifest the peculiar physical attributes mentioned above because titanium, and silicon are combined to form the so-called binary type oxide. Further, the binary composite oxide containing titanium and zirconium, the binary composite oxide containing zirconium and silicon, and the ternary composite oxide containing titanium, zirconium and silicon are characterized as composite oxides possessing the same qualities as $TiO_2$—$SiO_2$.

The composite oxides, on analysis by the X-ray diffraction, are found to possess an amorphous or substantially amorphous microstructure.

We have learnt that when the catalyst composition using a composite oxide of the foregoing description as catalyst component A is molded in the form of pellets, beads or honeycombs, since this catalyst component A eminently excels in moldability, the produced catalyst is enabled to retain its form intact for a long time in a continuous use even in a treatment of waste water demanding harsh conditions such as a high temperature, a high pressure, and a high pH value. Moreover, we have learnt that the catalyst excels in the efficiency with which the treatment of waste water is carried out.

By our experiment, it has been found that no satisfactory moldability is acquired by any of the several oxides of titanium, silicon, and zirconium or by a mere mixture of these elements, that if the oxide or the mixture is molded at all in the form of honeycombs, for example, the produced honeycombs cannot endure any protracted use, but that when these elements are converted into a composite oxide, the produced oxide manifests outstanding moldability and possesses highly satisfactory durability.

The catalyst component A of the catalyst used in this invention, i.e. one member selected from the group consisting of $TiO_2$—$SiO_2$, $TiO_2$—$ZrO_2$, $ZrO_2$—$SiO_2$, and $TiO_2$—$SiO_2$—$ZrO_2$, is desired to have a surface area not less than 30 $m^2/g$, preferably falling in the range of 50 to 300 $m^2/g$.

As regards the composition of the catalyst component A, the $TiO_2$—$SiO_2$ composite is desired to contain $TiO_2$ in the range of 20 to 95 mol %, preferably 50 to 95 mol %, and $SiO_2$ in the range of 5 to 80 mol %, preferably 5 to 50 mol %, the $TiO_2$—$ZrO_2$ composite is desired to contain $TiO_2$ in the range of 20 to 90 mol %, preferably 30 to 90 mol %, more preferably 30 to 80 mol %, and $ZrO_2$ in the range of 10 to 80 mol %, preferably 10 to 70 mol %, more preferably 20 to 70 mol %, the $ZrO_2$—$SiO_2$ composite is desired to contain $ZrO_2$ in the range of 20 to 90 mol %, preferably 40 to 90 mol %, and $SiO_2$ in the range of 10 to 80 mol %, preferably 10 to 60 mol %, and the $TiO_2$—$SiO_2$—$ZrO_2$ composite is desired to contain $TiO_2$ in the range of 20 to 95 mol %, preferably 30 to 95 mol %, and the sum of $SiO_2$ and $ZrO_2$ in the range of 5 to 80 mol %, preferably 5 to 70 mol % (invariably based on the total of $TiO_2$, $ZrO_2$, and $SiO_2$ taken as 100 mol %), calculated as an oxide. The ranges specified above are desirable for the purpose of enabling the produced catalyst to retain durability and catalytic activity long. Among other composite oxides mentioned above, the binary composite oxide of $TiO_2$—$ZrO_2$ proves to be particularly excellent in durability.

The ratio of the catalyst components making up the catalyst to be used in this invention is desirably such that the proportion of the catalyst component A falls in the range of 75 to 99.95% by weight as oxide and the catalyst component A falls in the range of 0.05 to 25% by weight as metal or compound. Desirably, of the elements which make up the catalyst component B, the amount of manganese, iron, cobalt, nickel, tungsten, copper, cerium, or silver to be used is in the range of 0 to 25% by weight as compound and the amount of platinum, palladium, rhodium, ruthenium, or iridium to be used is in the range of 0 to 10% by weight as metal (providing that the total amount of the two metals falls in the range of 0.05 to 25% by weight). More desirably, the catalyst component A accounts for a proportion in the range of 85 to 99.9% by weight as oxide and the catalyst component B for a proportion in the range of 0.1 to 15% by weight as metal or compound. Desirably, in the metals making up the catalyst component B, the amount of manganese, iron, cobalt, nickel, tungsten, copper, cerium, or silver to be used falls in the range of 0 to 15% by wight as compound and the amount of platinum, palladium, rhodium, ruthenium, or iridium to be used falls in the range of 0 to 5% by weight as metal, providing that the total amount of the two metals is in the range of 0.1 to 15% by weight. Of course, the total of the catalyst component A and the catalyst component B accounts for 100% by weight.

If the catalyst component B falls outside the aforementioned range, then the produced catalyst is deficient in oxidative activity. If any of the noble metals such as platinum, palladium, and rhodium is used in an unduly large amount, the cost of raw material is high and the effect to be manifested is not proportionately increased.

The catalyst to be used in this invention is desired to have a specific composition described above. As to the shape of the catalyst, the catalyst can be used in any of various shapes of monolithic structure such as, for example, pellets, beads, rings, saddles, granules, crushed particles, and honeycombs. The catalyst contemplated by this invention can be used in the form of a fixed bed or a fluidized bed. Our study performed as to the shape of the catalyst to be used in the treatment of waste water has led to a knowledge that the catalyst in the shape of honeycombs is most effective and that the honeycombs of catalyst produce an outstanding effect when they have through holes of a equivalent diameter in the range of 2 to 20 mm, a cell wall thickness in the range of 0.5 to 3 mm, and an opening ratio in the range of 50 to 80%. When the honeycombs of catalyst are given a large hole diameter (equivalent diameter of through holes), the resistance offered to the flow of waste water is proportionately small and the otherwise possible clogging of the holes with solid particles can be precluded and, at the same time, the geometric surface area of the catalyst is proportionately small. For the catalyst to manifest a stated efficiency of treatment, therefore, the amount of the catalyst must be increased in proportion as the hole diameter is increased. This hole diameter is accordingly restricted by the relation between the efficiency of treatment and the catalytic performance.

In the honeycomb-shaped catalyst, the equivalent diameter of the through holes is desired to fall in the range of 2 to 20 mm, preferably 4 to 12 mm. If this equivalent diameter is less than 2 mm, the catalyst cannot be easily used long in a continued treatment particularly when the waste water under treatment contains solid particles because the pressure loss is unduly heavy and the holes tend to be clogged. If the equivalent diameter exceeds 20 mm, the catalyst is deficient in catalytic activity, though the pressure loss is small and the possibility of clogging of the holes is low.

The cell wall thickness is in the range of 0.5 to 3 mm, preferably 0.5 to 2 mm. If the cell wall thickness is less than 0.5 mm, though there ensues an advantage that the pressure loss is small and the weight of the catalyst is small as well, the catalyst suffers from deficiency in mechanical strength. If the cell wall thickness exceeds 3 mm, though the mechanical strength is sufficient, the catalyst suffers from heavy pressure loss.

For the same reason as given above, the opening ratio of the catalyst is desired to be in the range of 50 to 80%, preferably 60 to 75%.

In due consideration of the various factors dealt with above, the honeycomb-shaped catalyst desirably used in the present invention is required to be such that the equivalent diameter of through holes is in the range of 2 to 20 mm, the cell wall thickness in the range of 0.5 to 3 mm, and the opening ratio in the range of 50 to 80%. The honeycomb-shaped catalyst which fulfils all these conditions possesses sufficient mechanical strength even under such harsh reaction conditions as a high reaction temperature falling not more than 370° C., preferably 100° to 370° C. and a high pressure enough for waste waster to retain the liquid phase thereof intact. Moreover, the catalyst possesses a sufficiently large geometric surface area and, therefore, excels in durability. Thus, it can treat waste water at a high linear velocity with low pressure loss. Even when the waste water under treatment happens to contain solid particles, the catalyst can retain high activity for a long time without suffering from clogging.

The through holes in the honeycomb-shaped catalyst can have any of popular cross-sectional shapes such as square, hexagon, and undulating circle. Any desired cross-sectional shape can be adopted so long as the equivalent diameter falls in the aforementioned range.

Our study pursued as to the oxidizing agent to be used in the treatment of waste water has led to a knowledge that when molecular oxygen and ozone and/or hydrogen peroxide are used collectively as an oxidizing agent, even organic substances such as acetic acid which are widely held to be rather poorly oxidizable can be decomposed with high efficiency and the reaction is enabled to proceed at relatively low temperature and low pressure. In any of the various applied treatments of the Zimmerman method which uses molecular oxygen as an oxidizing agent under conditions of high temperature and high pressure, combined use of molecular oxygen with ozone and/or hydrogen peroxide has never been reported in art. Further, since the catalyst used in this invention possesses an ability to decompose ozone thoroughly to oxygen, it enjoys a characteristic advantage that it will effect substantial decomposition of used ozone and prevent leakage of the used ozone from the system.

Sufficiently, the amount of ozone to be used is in the range of 0.001 to 0.6 mol, preferably 0.003 to 0.2 mol, per mol of the theoretical amount of ozone necessary for the organic and inorganic substances in the waste gas to be thoroughly decomposed into nitrogen, carbon dioxide gas, and water. It is sufficient to use hydrogen peroxide in an amount falling in the range of 0.001 to 1.8 moles, preferably 0.003 to 0.2 mol, per mol of the aforementioned theoretical amount. By using ozone and/or hydrogen peroxide in combination with molecular oxygen, the reaction temperature, though variable with the attributes of waste water under treatment, the amount of the oxidizing agent to be used, and other similar factors, is lower than when molecular oxygen is used alone. Where the reaction temperature is in the range of 200° to 300° C. in the reaction using molecular oxygen alone, for example, the temperature falls in the range of 100° to 250° C. in the same reaction using molecular oxygen in combination with oxidizing agent.

In the preparation of the $TiO_2$—$SiO_2$ for use in the present invention as catalyst component A, for example, the titanium source may be selected from among inorganic titanium compounds such as titanium chloride and titanium sulfate and organic titanium compounds such as titanium oxalate and tetraisopropyl titanate and the silicon source from among inorganic silicon compounds such as colloidal silica, water glass, and silicon tetrachloride and organic silicon compounds such as tetraethyl silicate. Some of the raw materials enumerated above contain a minute amount of extraneous substance. The inclusion of the extraneous substance does not matter very much so long as it has no appreciable effect upon the qualities of the $TiO_2$—$SiO_2$. Preferably, the preparation of the $TiO_2$—$SiO_2$ is attained by any of the following methods.

1. A method which comprises mixing titanium tetrachloride with silica sol, adding ammonia to the resulting mixture thereby inducing precipitation, separating and washing the resulting precipitate, drying the washed precipitate, and calcining the dry precipitate at a temperature in the range of 300° to 650° C., preferably 350° to 600° C.

2. A method which comprises adding as aqueous sodium silicate solution to titanium tetrachloride, causing them to react with each other and give rise to a precipitate separating and washing the precipitate, drying the washed precipitate, and calcining the dry precipitate at a temperature in the range of 300° to 650° C., preferably 350° to 600° C.

3. A method which comprises adding ethyl silicate $[(C_2H_5O)_4Si]$ to a water-alcohol solution of titanium tetrachloride thereby causing hydrolysis and consequent precipitation, separating and washing the resulting precipitate, drying the washed precipitate, and calcining the dry precipitate at a temperature in the range of 300° to 650° C., preferably 350° to 600°.

4. A method which comprises adding ammonia to a water-alcohol solution of titanium oxygen chloride ($TiOCl_2$) and ethyl silicate thereby giving rise to a precipitate, separating and washing the precipitate, drying the washed precipitate, and calcining the dry precipitate at a temperature in the range of 300° to 650° C., preferably 350° to 600° C.

Among in the preferred methods cited above, the method of (1) proves to be particularly desirable. Specifically, this method is carried out as follows: Compounds selected severally from the group of typical examples of the titanium source and the silicon source are weighed out in amount to form a composite oxide consisting of $TiO_2$ and $SiO_2$ in a prescribed ratio, mixed in the form of an acidic aqueous solution or as a sol containing titanium and silicon in a concentration in the range of 1 to 100 g/liter, preferably 10 to 80 g/liter as oxide, and then held at a temperature in the range of 10° to 100° C. The solution or sol is kept stirred, with aqua ammonia added dropwise thereto meanwhile as a neutralizing agent, for a period of 10 minutes to three hours until a coprecipitate composed of titanium and silicon is formed at a pH in the range of 2 to 10. This coprecipitate is separated by filtration, thoroughly washed, then dried at a temperature in the range of 80° to 140° C. for a period of 1 to 10 hours, and calcined at a temperature in the range of 300° to 650° C., preferably 350° to 600° C. for a period of one to 10 hours, preferably 2 to 8 hours, to give birth to $TiO_2$—$SiO_2$.

The $TiO_2$—$ZrO_2$—$SiO_2$ is prepared by the same method as used for the preparation of the $TiO_2$—$SiO_2$. In this case, the zirconium source may be selected from among inorganic zirconium compounds such as zirconium chloride and zirconium sulfate and organic zirconium compounds such as zirconium oxalate. Specifically, by handling a zirconium compound and a titanium compound suitably selected by the same method as described above, there can be easily prepared the $TiO_2$—$ZrO_2$—$SiO_2$. The amount of zirconium to be present in this ternary composite oxide is desired to be not more than 30% by weight as $ZrO_2$, based on the total amount of the $TiO_2 + ZrO_2 + SiO_2$. The preparation of the $TiO_2$—$ZrO_2$ can be carried out in the same manner as described above.

Desirably, the $TiO_2$—$ZrO_2$ composite can be prepared by either of the following methods.

1. A method which comprises mixing titanium chloride with zirconium oxychloride, adding ammonia to the resultant mixture thereby inducing precipitation in the mixed system, washing and drying the precipitate, and calcining the clean dry precipitate at a temperature in the range of 300° to 650° C., preferably 350° to 600° C.

2. A method which comprises adding zirconyl nitrate to titanium tetrachloride, subjecting the resultant mixture to thermal hydrolysis thereby inducing precipitation in the mixed system, washing and drying the precipitate, and then calcining the clean dry precipitate at a temperature in the range of 300° to 650° C., preferably 350° to 600° C.

From the $TiO_2$—$SiO_2$, $TiO_2$—$ZrO_2$, $ZrO_2$—$SiO_2$, or $TiO_2$—$SiO_2$—$ZrO_2$ composite prepared by either of the foregoing methods, a complete catalyst is obtained by a suitable method. A typical method comprises mixing the $TiO_2$—$SiO_2$ composite in a powdery form with a molding auxiliary, kneading the resultant mixture under addition of a suitable amount of water, and molding the resultant blend in the shape of beads, pellets, sheets, or honeycombs by the use of an extrusion molder.

By drying the molded composite at a temperature in the range of 50° to 120° C. and then calcining the dried molded composite as swept with air at a temperature in the range of 300° to 800° C., preferably 350° to 600° C., for a period in the range of 1 to 10 hours, preferably 2 to 6 hours, there is obtained a catalyst.

Production of a catalyst by the addition of metals selected from the group consisting of manganese, iron, nickel, cobalt, tungsten, copper, cerium, silver, platinum, palladium, rhodium, ruthenium, and iridium to the $TiO_2$—$ZrO_2$ composite can be accomplished by causing an aqueous solution of the metal salts to impregnate the molded $TiO_2$—$ZrO_2$ composite thereby effecting deposition of the metal salts on the composite and drying and calcining the resultant impregnated composite.

Alternatively, the production may be attained by adding the aqueous solution of the metal salt in combination with a molding auxiliary to the $TiO_2$—$ZrO_2$ composite in powdery form, blending them, and molding the resultant blend.

Examples of the starting materials for the catalyst component B to be used in combination with the catalyst component A in the preparation of the catalyst of this invention include oxides, hydroxides, inorganic acid salts, and organic acid salts. More specifically, the starting materials may be suitably selected from among ammonium salts, oxalates, nitrates, sulfates, and halides.

In accordance with the present invention, wet oxidation can be effectively carried on various forms of waste water containing oxidizable organic or inorganic substances, such as supernatant and sedimented activated sludge occurring in the activated sludge treatment, waste water from fermentation, effluent from the process for polymerization of an organic compound, cyan-containing plant effluent, phenol-containing plant effluent, oil-containing waste water, effluent from a chemical plant, general industrial waste water from a food processing plant, etc., raw sewage, sewage, and sewage sludge. When the present invention is worked out by the use of the catalyst in the shape of honeycombs, even waste water containing solid particles in a concentration of more than 0.1 g/liter can be treated stably for a long time.

As to the reaction conditions befitting the purpose of this invention, the reaction temperature is below 370° C., generally in the range of 100° to 370° C., preferably 200° to 300° C. The pressure inside the reaction system is required to be enough for the waste water under treatment to retain the liquid phase thereof intact, specifically falling in the range of 0 to about 200 kg/cm$^2$, preferably 0 to 150 kg/cm$^2$. The molecular oxygen-containing gas to be fed into the reaction system is used in an amount of 1 to 1.5 times, preferably 1.2 to 1.5 times, the theoretical amount necessary for the oxidative decomposition aimed at. The amount of the catalyst to be packed in the reaction column is approximately 5 to 99%, preferably 20 to 99%, of the spacial capacity of the reaction column. The waste water, to be effectively oxidized, is fed in combination with the molecular oxygen-containing gas to the catalyst bed kept at a prescribed temperature at a flow rate such that the retention time thereof will be in the range of 6 to 120 minutes, preferably in the range of 12 to 60 minutes.

Examples of the molecular oxygen-containing gas used effectively herein include air, mixed gas of oxygen with air, and a gas generally called an oxygen-enriched air. This gas is desired to have an oxygen content of not less than 25%. Though the pH value of the reaction system may be on the acid or on the alkali side, it is desired to fall in the range of 9 to 11.

As to the reaction conditions in the treatment using ozone and/or hydrogen peroxide as an oxidizing agent in combination with the molecular oxygen, the reaction temperature generally falls in the range of 100° to 250° C., the reaction pressure is such as to enable the waste water to retain the liquid phase thereof intact inside the reaction column, specifically falling in the range of 0 to 200 kg/cm$^2$, preferably 0 to 150 kg/cm$^2$, and the retention time falls in the range of 3 to 120 minutes, preferably 5 to 60 minutes. The amount of ozone to be used is in the range of 0.001 to 0.6 mol, preferably 0.003 to 0.2 mol, per mol of theoretical amount of oxygen. The amount of hydrogen peroxide to be used falls in the range of 0.001 to 1.8 mols, preferably 0.003 to 0.2 mol, per mol of the theoretical amount of oxygen.

Now, the present invention will be described more specifically below with reference to working example. It should be noted, however, that this invention is not limited to these examples.

EXAMPLE 1

A composite oxide comprising titanium and silicon was prepared as follows. An aqueous sulfuric acid solution of titanyl sulfate having the following composition was used as a titanium source.

$TiOSO_4$ (as $TiO_2$): 250 g/liter
Total $H_2SO_4$: 1,100 g/liter

Separately, 28 liters of aqua ammonia ($NH_3$, 25%) was added to 40 liters of water and 2.4 kg of Snowtex-NCS-30 (silica sol containing about 30% by weight of silica as $SiO_2$; product of Nissan Chemicals Industries Ltd.) was added further added thereto. To the resulting solution, a titanium-containing aqueous sulfuric acid solution prepared by diluting 15.3 liters of the aqueous sulfuric acid solution of titanyl sulfate with 30 liters of water was gradually added dropwise while under agitation to give rise to a coprecipitate gel. The resulting reaction mixture was left standing at rest for 15 hours. The $TiO_2$—$SiO_2$ gel thus obtained was separated by filtration washed with water, and then dried at 200° C. to for 10 hours.

The dry $TiO_2$—$SiO_2$ gel was calcined under an atmosphere of air at 550° C. for six hours. The powder thus obtained had a composition of $TiO_2:SiO_2=4:1$ (molar ratio) and a BET surface area of 185 m$^2$/g. The powder which will be referred to hereinafter as TS-1 was used to prepare an ozone decomposition catalyst as follows.

In a kneader, 900 ml of water, 1,500 g of the powder, and 75 g of starch were thoroughly kneaded. The resultant blend was further kneaded with a suitable amount of water. The blend consequently obtained was extrusion molded in the shape of honeycombs having a hole diameter (equivalent diameter of through holes) of 3 mm and an opening ratio of 64%, dried at 120° C. for six hours, and thereafter calcined at 450° C. for six hours in an atmosphere having an oxygen concentration adjusted to below 15%.

The molded composite so obtained was immersed in an aqueous palladium nitrate solution until sufficient impregnation, then dried at 120° C. for six hours, and calcined at 450° C. for six hours in an atmosphere of air. The complete catalyst thus obtained had a percentage composition of TS-1:Pd=97:3.

EXAMPLE 2

$TiO_2$—$ZrO_2$ was prepared as follows.

In 100 liters of cold water, 1.93 kg of zirconium oxychloride ($ZrOCl_2$ $8H_2O$) was dissolved. In the resulting solution 7.7 liters of an aqueous sulfuric acid solution of titanyl sulfate having the same composition as used in Example 1 was added and thoroughly mixed. The mixture thus formed was kept amply stirred at a temperature of about 30° C. and aqua ammonia was gradually added thereto until the pH reached 7. The resulting reaction mixture was left standing at rest for 15 hours.

The $TiO_2$—$ZrO_2$ gel thus obtained was separated by filtration, washed with cold water, and then dried at 200° C. for 10 hours. Then, the dry gel was calcined under an atmosphere of air at 550° C. for six hours. The powder consequently obtained had a composition of $TiO_2:ZrO_2=4:1$ (molar ratio) and a BET surface area of 140 $m^2/g$. The powder thus obtained will be referred to hereinafter as TZ-1.

By using this TZ-1 and following the procedure of Example 1, there was obtained a honeycomb shaped article. Then by using an aqueous chloroplatinic acid solution instead of the aqueous palladium nitrate and following the procedure of Example 1, there was obtained a catalyst having weight ratio of TZ-1:Pt=99:1.

EXAMPLE 3

$TiO_2$—$SiO_2$—$ZrO_2$ was prepared by following the procedures of Examples 1 and 2. The powder consequently obtained had a composition of $TiO_2:SiO_2:ZrO_2=80:16:4$ (molar ratio) and a BET surface area of 180 $m^2/g$. The powder thus obtained will be referred to hereinafter as TSZ-1.

By using this TSZ-1 instead of TS-1 and following the procedure of Example 1, there was obtained a honeycomb shaped catalyst having weight ratio of TSZ-1:Pd=97:3.

EXAMPLE 4

Catalyst having weight ratio of TZ-1:Ru=98:2 was prepared by using an aqueous solution of ruthenium chloride solution instead of the aqueous chloroplatinic acid solution and following the procedure of Example 2.

EXAMPLES 5-6

Catalysts were prepared by following the procedure of Example 4, except that $TiO_2$—$ZrO_2$ composite oxide powder was used with different $TiO_2/ZrO_2$ molar ratios.

|  | $TiO_2:ZrO_2$ (molar ratio) |
| --- | --- |
| Example 5 | 60:40 |
| Example 6 | 40:60 |

EXAMPLE 7

A honeycomb-shaped molded composite having through holes of a equivalent diameter of 4 mm, a cell wall thickness of 0.8 mm, and an opening ratio of 69% was obtained from the TZ-1 powder produced in Example 2. Then, the molded composite was immersed in an aqueous chloroplatinic acid solution, dried at 120° C., and thereafter calcined at 450° C. in an atmosphere of air, to produce a complete catalyst. The complete catalyst thus obtained had a weight ratio of TZ-1:Pt=99:1.

EXAMPLE 8

A complete catalyst was produced by following the procedure of Example 7, except that honeycomb-shaped molded composite having through holes of equivalent diameter of 8 mm, a cell wall thickness of 2 mm, and an opening ratio of 64% was used instead. The complete catalyst had a weight ratio of TZ-1:Pt=99:1.

CONTROL 1

By following the procedure of Example 1, palladium was deposited on commercially available carrier beads of titanium dioxide 5 mm in diameter. The complete catalyst consequently obtained had a weight ratio of $TiO_2:Pd=97:3$.

EXAMPLE 9

Treatment of waste water by wet oxidation was carried out by the following method, using each of the catalysts obtained in Example 1-3 and Control 1. A reaction column of stainless steel was packed with the catalyst. The waste water heated and mixed in advance and a gas containing oxygen in a concentration of 30% were fed into the reaction column via an inlet at the base. After 500 hours' treatment continued in this manner, the treated waste water was analyzed to determine the ratio of removal of fouling matter. The waste water used in the treatment had a COD (Cr) content of 40 g/liter, a total nitrogen content of 2.5 g/liter (inclusive of an ammoniac nitrogen content of 300 mg/liter), and a total solids content of 10 g/liter. This waste water admixed with caustic soda was continuously introduced into the reaction column. Samples of the waste water taken at the inlet and the outlet of the reaction column were analyzed for COD (Cr) content, total nitrogen content, and ammoniac nitrogen content, to determine the ratio of removal of fouling matter. Prior to the delivery to the reaction column, this waste water had the pH value thereof adjusted to 10 by addition of caustic soda. As to the reaction condition, the reaction temperature was 260° C., the reaction pressure was 75 $kg/cm^2$, the special velocity of waste water was 1.3 $hr^{-1}$ (based on empty column), and the linear velocity of waste water was 10 m/hr. The oxygen containing gas introduced at a space velocity of 190 $hr^{-1}$ (based on empty column under standard condition) into the reaction column.

The results obtained of the catalysts of Examples 1, 2, and 3 indicate that the ratios of COD removal were respectively 99.9%, 99.9%, and 99.9%, the ratios of removal of total nitrogen were respectively 99.2%, 99.1%, and 99.3%, and the ratios of removal of ammoniac nitrogen were 99.9% 99.8%, and 99.9%.

In the treatment using the catalyst of Control 1, the catalyst bed was clogged after 70 hours following the start of the reaction so that the flow of the waste water was impeded and the treatment could not be thoroughly carried out.

EXAMPLE 10

Treatment of waste water was carried out by the following method using each of the catalysts obtained in Examples 4-6. A reaction column of stainless steel was packed with the catalyst. The waste water heated and mixed in advance and a gas containing oxygen in a concentration of 30% were continuously fed into the reaction column via an inlet at the base for 800 hours. Samples of waste water taken at the inlet and the outlet of the reaction column were analyzed for COD (Cr) content, total nitrogen content, and ammoniac nitrogen content to determine the ratios of removal. The waste water used in the treatment had a COD (Cr) content of 30 g/liter and a total nitrogen content of 1.9 g/liter). (inclusine of an ammoniac nitrogen content of 900 mg/liter). This waste water was adjusted to pH 10 by addition of caustic soda. As to the reaction conditions, the reaction temperature was 260° C., the reaction pressure was 75 kg/cm$^2$, and the space velocity of waste water was 1.5 hr$^{-1}$ (based on empty column). The oxygen-containing gas was fed into the reaction column at a space velocity of 150 hr$^{-1}$ (based on empty column under standard conditions). The results were as shown in Table 1.

TABLE 1

|  | Ratio of removal of COD (%) | Ratio of removal of total nitrogen (%) | Ratio of removal of ammoniac nitrogen (%) |
| --- | --- | --- | --- |
| Example 4 | 99.9 | 99.4 | 99.8 |
| Example 5 | 99.9 | 99.1 | 99.6 |
| Example 6 | 99.9 | 99.3 | 99.6 |

EXAMPLE 11

Treatment of waste water by wet oxidation was carried out by the following method, using each of the catalyst obtained in Examples 7 and 8. A reaction column of stainless steel was packed with the catalyst. The waste water heated and mixed in advance and a gas containing oxygen in a concentration of 40% were continuously introduced into the reaction column via an inlet at the base for 500 hours. Samples of waste water taken at the inlet and the output of the reaction column were analyzed for COD (Cr) content, total nitrogen content, and ammoniac nitrogen content. The waste water had the pH value thereof adjusted to 10 by addition of caustic soda. As to the reaction conditions, the reaction temperature was 240° C., the reaction pressure was 50 kg/cm$^2$, the space velocity of waste water was 1 hr$^{-1}$ (based on empty column), and the linear velocity of waste water was 10 m/hr. The oxygen-containing gas was introduced into the reaction column as a space velocity of 100 hr$^{-1}$ (based on empty column under standard conditions). The results consequently obtained in the treatments using the catalysts of Example 7 and Example 8 indicate that the ratios of removal of COD were respectively 99.9% and 98.9%, the ratios of removal of total nitrogen were respectively 98.4% and 93.5%, and the ratios of removal of ammoniac nitrogen were respectively 99.6% and 97.5%.

EXAMPLE 12

Treatment of waste water by wet oxidation was carried out by the following method using the catalyst obtained in Example 2. A reaction column of stainless steel was packed with the catalyst. The waste water heated and mixed in advance and a gas containing oxygen in a concentration of 30% and ozone in a concentration of 1% were continuously introduced into the reaction column via an inlet at the base. Samples of waste water taken at the inlet and outlet of the reaction column were analyzed for COD (Cr) content to determine the ratio of removal. The waste water used in the treatment had a COD (Cr) content of 10 g/liter. It was adjusted to pH 10 by addition of caustic soda. As to the reaction conditions, the reaction temperature was 190° C., the reaction pressure was 40 kg/cm$^2$, and the space velocity of waste water was 2 hr$^{-1}$ (based on empty column). The gas containing oxygen and ozone was introduced into the reaction column at a space velocity of 60 hr$^{-1}$ (based on empty column under standard conditions). The results indicate that the ratio of removal of COD was 92%.

EXAMPLE 13

Treatment of waste water was carried out by following the procedure of Example 12, except that a mixed gas containing oxygen in a concentration of 30% and ozone in a concentration of 1% was introduced at a space velocity of 60 hr$^{-1}$ (based on empty column under standard conditions) and, at the same time, an aqueous 3% hydrogen peroxide solution was introduced at a space velocity of 0.004 hr$^{-1}$ (based on empty column under standard conditions) into the reaction column. The results indicate that the ratio of removal of COD was 93%.

What is claimed is:

1. A method for the treatment of waste water which comprises subjecting said waste water to wet oxidation at a temperature of not more than 370° C. under a pressure enough for said waste water to retain the liquid phase thereof intact under continued supply of a gas containing oxygen in an amount of 1.0 to 1.5 times the theoretical amount necessary for enabling organic and inorganic substances contained in said waste water to be decomposed thoroughly into nitrogen, carbon dioxide, and water, in the presence of a catalyst composed of catalyst component A comprising a composite oxide of at least two metals selected from the group consisting of titanium, silicon, and zirconium and catalyst component B comprising at least one metal selected from the group consisting of manganese, iron, cobalt, nickel, tungsten, copper, cerium, silver, platinum, palladium, rhodium, ruthenium, and iridium or a water-insoluble or sparingly water-soluble compound of said metal.

2. A method according to claim 1, wherein said catalyst has a composition such that said catalyst component A accounts for a proportion in the range of 75 to 99.95% by weight as oxide and said catalyst component B for a proportion in the range of 0.05 to 25% by weight as metal or compound.

3. A method according to claim 1, wherein said catalyst component A of said catalyst is at least one member selected from the group consisting of (a) a binary TiO$_2$—SiO$_2$ composite oxide containing 20 to 95 mol % of titania (TiO$_2$) and 5 to 80 mol % of silica (SiO$_2$), (b) a binary TiO$_2$—ZrO$_2$ composite oxide containing 20 to 90 mol % of TiO$_2$ and 10 to 80 mol % of zirconia (ZrO$_2$), (c) a binary ZrO$_2$—SiO$_2$ composite oxide containing 20 to 90 mol % of ZrO$_2$ and 10 to 80 mol % of SiO$_2$, and (d) a ternary TiO$_2$—SiO$_2$—ZrO$_2$ composite oxide containing 20 to 95 mol % of TiO$_2$ and 5 to 80 mol % of the sum of SiO$_2$ and ZrO$_2$.

4. A method according to claim 1, wherein said catalyst components A is a binary TiO$_2$—ZrO$_2$ composite oxide.

5. A method according to claim 3, wherein said catalyst component A is a binary TiO$_2$—ZrO$_2$ composite oxide.

6. A method according to claim 1, wherein said catalyst is in a monolithic structure.

7. A method according to claim 6, wherein said catalyst is a honeycomb-shaped catalyst having through holes of a equivalent diameter in the range of 2 to 20 mm, a cell wall thickness in the range of 0.5 to 3 mm, and an opening ratio in the range of 50 to 80%.

8. A method according to claim 7, wherein said catalyst component A is a binary $TiO_2$—$ZrO_2$ composite oxide containing 20 to 90 mol % of $TiO_2$ and 10 to 80 mol % of $ZrO_2$.

9. A method according to claim 1, wherein the reaction temperature is in the range of 100° to 370° C.

10. A method according to claim 1, wherein said catalyst component A accounts for 85 to 99.9% by weight as oxide and said catalyst component B for 0.1 to 15% by weight as metal or compound., 11. A method according to claim 10, wherein of the metallic elements making up said catalyst component B, the amount of manganese, iron, cobalt, nickel, tungsten, copper, cerium, or silver to be used accounts for 0 to 15% by weight as compound and the amount of platinum, palladium, rhodium, ruthenium, or iridium to be used accounts for 0 to 5% by weight as metal, providing that the total amount of the two metals falls in the range of 0.1 to 15% by weight.

12. A method according to claim 10, wherein said catalyst component B is the oxide of at least one metal selected from the group consisting of manganese, iron, cobalt, nickel, tungsten, copper, cerium, and silver.

13. A method according to claim 10, wherein said catalyst component B is at least one metal selected from the group consisting of platinum, palladium, rhodium, ruthenium, and iridium.

14. A method according to claim 1, wherein said catalyst component A has a surface area of not less than 30 $m^2/g$.

15. A method according to claim 1, wherein the passage through said catalyst of waste water in combination with an oxygen-containing gas is carried out in the presence of at least one gas selected from the group consisting of ozone and hydrogen peroxide.

16. A method according to claim 15, wherein the amount of ozone to be used falls in the range of 0.001 to 0.6 mol per mol of the theoretical amount of oxygen necessary for the organic and inorganic substances contained in said waste water to be thoroughly decomposed into nitrogen, carbon dioxide gas, and water.

17. A method according to claim 15, wherein the amount of hydrogen peroxide to be used falls in the range of 0.001 to 1.8 mols per mol of the theoretical amount of oxygen necessary for the organic and inorganic substances contained in said waste water to be thoroughly decomposed into nitrogen, carbon dioxide, and water.

* * * * *